United States Patent [19]
Tucker

[11] Patent Number: 5,108,807
[45] Date of Patent: Apr. 28, 1992

[54] DEGRADABLE MULTILAYER THERMOPLASTIC ARTICLES

[75] Inventor: Edward B. Tucker, Romeoville, Ill.

[73] Assignee: First Brands Corporation, Danbury, Conn.

[21] Appl. No.: 493,583

[22] Filed: Mar. 14, 1990

[51] Int. Cl.⁵ .............................................. B65D 30/02
[52] U.S. Cl. .................... 428/35.2; 428/35.4; 428/516; 428/518; 428/520; 428/522; 428/476.1; 383/1; 524/47; 524/52; 524/322
[58] Field of Search ................ 383/1; 428/35.2, 36.6, 428/35.4, 36.7, 516, 518, 520, 522; 524/322, 52, 47

[56] References Cited

U.S. PATENT DOCUMENTS

| | | | |
|---|---|---|---|
| 3,935,141 | 1/1976 | Potts | 524/322 |
| 4,133,784 | 1/1979 | Otey | 524/52 |
| 4,254,169 | 3/1981 | Schroeder | 428/36.6 |
| 4,399,173 | 8/1983 | Anthony | 428/35.2 |

Primary Examiner—James J. Seidleck
Assistant Examiner—Rena Dye
Attorney, Agent, or Firm—Gary L. Warner

[57] ABSTRACT

The invention relates to multilayer degradable thermoplastic articles. In one embodiment the novel multilayer thermoplastic article comprises a first outer layer, a core layer and second outer layer, wherein the first outer layer and second outer layer are degradable by photo, thermal or chemical means and contain an effective amount of a prodegradant and the core layer is a water-soluble and/or biodegradable core layer, preferably both water-soluble and biodegradable. Bags formed from the multilayer thermoplastic article are useful for use in the composting of organic material.

68 Claims, No Drawings

DEGRADABLE MULTILAYER THERMOPLASTIC ARTICLES

FIELD OF THE INVENTION

The instant invention relates to novel multilayer degradable thermoplastic articles, preferably a multilayer degradable thermoplastic film structure. The novel degradable articles comprise a first outer layer, core layer and a second outer layer, wherein the first outer layer and second outer layer are formed from a degradable thermoplastic material containing a prodegradant and the core layer is formed from a water soluble and/or biodegradable thermoplastic material. The novel degradable thermoplastic articles are characterized by their novel dual-degradation mechanism, as hereinafter discussed. Bags made from the multilayer degradable thermoplastic film are well suited for use in composting.

BACKGROUND OF THE INVENTION

The use of thermoplastic materials for the manufacture of numerous products, including containers, e.g., bags of all varieties, is well known in the art. The use of thermoplastic articles is so widespread that the disposal of thermoplastic articles has become a significant world wide problem. Although it is preferable to recycle as great a portion of these thermoplastic articles as possible into new products, it is acknowledged that at least some finite portion of these articles will ultimately be discarded as unsuitable for recycle applications. The two most traditional mechanisms by which such articles are disposed are by incineration or by depositing the thermoplastic articles in a landfill. The growing use of thermoplastic articles and, accordingly, their ever increasing disposal has resulted in considerable activity relating to methods for controlling the evergrowing volume of thermoplastic materials to be disposed.

Unfortunately, as above noted, recycle programs are not effective for all thermoplastic articles such as the case where the article acts as the container for refuse, such as is the case for household trash, and other types of disposable bags made from thermoplastic films. The particular problems associated with disposer bags is multifaceted owing to the wide array of uses for such bags and, further, owing to the need to manufacture such bags from a multifunctional thermoplastic material that meets both the performance and varied use requirements of today's consumer. In addition, such thermoplastic bags must be disposable in an environmentally responsible way when disposed after the article's useful life.

Although many learned individuals have considered the above disposal problems, it is painfully clear that very few ideas have seen the "commercial light of day". Currently, the disposal problem associated with thermoplastic bags, although only a minute segment of the total quantity of thermoplastic articles disposed of on an annual basis, is being addressed by two different approaches. The first approach is to add a prodegradant, e.g., iron stearate, to the thermoplastic material whereby the rate of photodegradation and/or thermal degradation is increased over that of the original thermoplastic material. Although this approach is extremely useful when the thermoplastic article is placed in sunlight or a thermally activating environment, it is too often the case that the thermoplastic article will be placed in a landfill prior to having significant degradation occur. The second approach involves the use of small amounts of biodegradable fillers for the thermoplastic material. The use of a biodegradable filler typically incorporates a prodegradant also, as above discussed. The biodegradable filler is generally a starch, modified starch or cellulosic component which would be degradable by microorganisms in an oxygen-rich landfill environment. Unfortunately, long term management of landfills has made this approach only a partial solution. It has been observed that many landfills are maintained as dry, anerobic environments as a result of the desire to minimize the leaching of landfill contaminants into ground water. Accordingly, the long term degradation mechanism for the starch component may be halted before it can progress to any meaningful degree. Further, the addition of starch components in amounts up to about ten (10) weight percent have been reported to significantly decrease the strength of thermoplastic film products such as the various polyethylenes. In fact, the net result of adding the starch component will in all likelihood be an overall increase in the amount of thermoplastic employed in manufacturing the article, since an overall increase in the amount of the thermoplastic will be required to maintain the necessary performance characteristics of the thermoplastic article. Further, the addition of a starch or other component as a "filler" for a thermoplastic article does not render the thermoplastic material biodegradable. The thermoplastic material remains after the biodegradable filler is removed, although the form of thermoplastic article may fragment to some extent as a result of the degradation of the biodegradable component.

The aforementioned considerations have resulted in numerous patents and voluminous prior art relating to degradable thermoplastic materials. A review of the more interesting and relevant prior art is considered hereinafter.

U.S. Pat. No. 4,016,117 is directed towards a biodegradable synthetic resin composition which includes a polymer, a biodegradable filler (which may be starch, as set forth in claim 2), and an auto-oxidizable substance, which may be a fatty acid, which auto-oxidizes when in contact with a transition metal salt. It is said that the composition degrades in the soil, although clearly it is only the biodegradable filler that undergoes biodegradation.

U.S. Pat. No. 4,256,851 is directed towards an environmentally degradable plastic composition which comprises an admixture of a polyolefin and an ethylenically unsaturated alcohol. Claim 6 recites a specific antioxidant.

U.S. Pat. No. 4,021,388 is a divisional of U.S. Pat. No. 4,016,117, discussed above. The '388 patent has claims directed towards a biodegradable composition which includes a polymer having carbon to carbon linkages with starch granule dispersed therein. The claims further recite that the surface of the granules are modified by reaction with a compound which reacts with hydroxyl groups to form an ether or an ester.

U.S. Pat. No. 4,133,784 has claims directed towards a biodegradable film composition which comprises a dry composite of a starchy material and a water-dispersable ethylene acrylic acid copolymer.

U.S. Pat. No. 4,337,181 has claims which are directed towards a biodegradable film and method of making such a film. The method involves mixing a gelatinized starchy material with an ethylene acrylic acid copolymer to produce a plasticized matrix which is then shaped into a film. The method further includes the steps of adding an ammonia neutralizing agent to the mixture, adjusting the moisture content to a specified range and extrusion blowing the mixture into a film.

U.S. Pat. No. 4,454,268 is directed towards a semi-permeable film and method of making such a film. The film includes an ethylene acrylic acid copolymer and a starchy material.

U.S. Pat. No. 4,324,709 has claims directed towards a plastic-based composition and method of making such a composition. The composition includes a synthetic polymer and starch granules which have a modifying substance absorbed therein.

U.S. Pat. No. 3,935,141 discloses an environmentally degradable ethylene polymer composition comprising: about 0.01 to about 40 percent by weight of at least one auto-oxidative susceptible additive; about 0.002 to about 2.0 percent by weight of the metal atom of at least one salt of at least one polvalent metal selected from the group consisting of titanium, vanadium, chromium, manganese, iron, cobalt, nickel, copper, zinc and cerium; and about 0.0025 to about 1 percent by weight of an antioxidant for the ethylene polymer. The patentee discloses the use of organic salts of the polyvalent metals, including stearate, octoate, dodecyl acetoacetate, oleate and distearate. In selecting the antioxidant the patentee discloses that commonly employed antioxidants may be employed, as described at column 8, line 19 to column 9, line 12. The patentee notes, at column 2, lines 40 to 51, that one can proportion the amounts of antioxidant and additives to give a structurally stable product during the useful life period of the product but which will undergo embrittlement within a relatively short time after exposure to the elements.

PCT/GB88/00386 (PCT application), to Griffin discloses a degradable polymer composition wherein an antioxidant and pro-oxidant are combined whereby as the antioxidant is stated to be depleted with time. After total depletion of the antioxidant a residual concentration of prooxidant remains and is stated to provide a sharp loss in the physical strength of the degradable polymer composition. The application discloses use of a stable polymer such as low-density polyethylene, linear low density polyethylene, high density polyethylene, polypropylene, or polystyrene, together with a less stable unsaturated elastomer type compound made from the polymerization of 1:4 dienes, or the copolymerization of such 1:4 dienes with ethenoid comonomers, such as styrene-butadiene elastomer or natural rubber. The invention embodies less stable substances capable of auto-oxidation because such substances are more readily initiated by the oxidation process by virtue of their unsaturation. Once the auto-oxidation process is initiated, the process is said to involve more resistant saturated substances such as polyolefins, although no data is disclosed to support this claim.

Although not directly related to degradable thermoplastic compositions, several patents are of interest owing to their disclosure of multilayer films. U.S. Pat. Nos. 4,254,169 and 4,239,826 disclose multilayer barrier films having a core layer of ethylene vinyl alcohol polymers or vinyl alcohol polymers or copolymers thereof. The patentee in U.S. Pat. No. 4,254,169 discloses that a delamination resistant multilayer structure of a barrier layer comprising a substantially pure polymer or copolymer of vinyl alcohol may be formed with an adhered layer of a modified polyolefin which consists essentially of a polyolefin polymer or copolymer blended with a graft copolymer of polyethylene and an unsaturated fused ring carboxylic acid anhydride. Modified polyolefin blends of this type are discussed by the patentee in column 3, lines 1 to 21 wherein the patentee discloses that such modified polyolefin blends are available under the name PLEXAR ®. The patentee discusses the nature of the multilayer barrier film and the goals to be achieved in several ways. For example, as noted at column 2, lines 42 to 53, because of the core layer's excellent barrier properties, the core layer can be made quite thin, in the range of 0.1 mil or less. The patentee views this as an advantage which results from using the modified polyolefin blends as an outer film layer. Further, at column 2, lines 20 to 38, the patentee characterizes the multilayer barrier film for its high resistance to the passage of gas and moisture. The patentee further states that the invention is preferrably manufactured by cast coextrusion, but can be manufactured by blown film coextrusion, water quench coextrusion, or lamination and that the resultant film can be satisfactorily heat sealed.

U.S. Pat. No. 4,640,852 is directed towards a multiple layer film (see: Claim 2) which comprises a nylon layer, an ethylene vinyl alcohol copolymer layer, and a layer of nylon.

Another area of interest relating to the use of degradable thermoplastic bags is in the field of composting. Although the prior art has broadly addressed the issue of degradable polymers, the issue of use of degradable thermoplastic bags in composting has not received wide spread attention. In the majority of current composting applications a Kraft paper leaf bag has been employed. Typically, if a thermoplastic bag has been employed to contain yard waste a preparatory step of debagging the yard waste from the thermoplastic bag has been required. In an attempt to improve the utility of thermoplastic bags in composting the use of biodegradable additives, e.g., starch, in the thermoplastics has been suggested. Unfortunately, as above discussed, the addition of small amounts, typically on the order of 1 to 10 weight percent, of a biodegradable additive does not make the remaining thermoplastic material degradable, although it may result in some loss in the tensile strength of the thermoplastic bag. A thermoplastic bag specifically designed for use in composting is needed.

The instant invention is directed towards the problem of improving the degradation of thermoplastic articles when such are subjected to environmental conditions as encountered in landfills and composting.

SUMMARY OF THE INVENTION

The instant invention relates to novel multilayer degradable thermoplastic articles. In one embodiment the novel multilayer degradable thermoplastic article comprises a first outer layer, core layer and a second outer layer, wherein the first outer layer and second outer layer are a degradable thermoplastic material containing an effective amount of a prodegradant and the core layer is a water soluble and/or biodegradable thermoplastic material. The multilayer degradable thermoplastic articles of the instant invention find use in the manufacture of thermoplastic articles of various types and are particularly useful in the construction of bags wherein the multilayer structure is provided in the form of a film from which various types of bags may be manufactured.

DETAILED DESCRIPTION OF THE INVENTION

The instant invention relates to a multilayer degradable thermoplastic article and also relates to a multilayer degradable thermoplastic film structure useful in the manufacture of products formed from multilayer thermoplastic laminates, including molded containers, bags and films for a variety of uses, including bags useful in composting.

The multilayer degradable thermoplastic articles comprise a first outer layer, core layer and a second outer layer, wherein the first outer layer and second outer layer are generally characterized as being photodegradable and/or thermally degradable thermoplastic materials and preferably contain an effective amount of a prodegradant. The core layer is characterized as being a water soluble and/or biodegradable thermoplastic material, and, is characterized as being more biodegradable and/or water soluble than the first outer layer and second outer layer. The characterization of a thermoplastic material herein as being photodegradable, thermally degradable, biodegradable and/or water soluble are discussed hereinafter.

The terms "photodegradable", "thermally degradable", "biodegradable" and "water soluble" are employed herein to refer to physical and chemical properties of the thermoplastic materials.

The term "photodegradable" as used herein is meant to denote a thermoplastic material characterized by susceptability to ultraviolet (UV) light initiated oxidative chain scission reactions resulting in molecular weight reduction, (preferably substantially complete loss) of tensile strength, and embrittlement to the extent that mechanical stresses, such as those arising from wind or rain break the thermoplastic material into smaller fragments.

The term "thermally degradable" as used herein is meant to denote a thermoplastic material characterized by a susceptibility to the scissioning of main chain chemical bonds as a result of overcoming bond dissociation energies under the influence of moderately elevated temperature e.g., such as heating at temperatures above room temperature, e.g., at a temperature between about 100° F. and about 160° F., preferably between about 110° F. and about 150° F. The results of thermal degradation include changes in the physical and chemical properties of the thermoplastic material, such as molecular weight reduction, loss of tensile strength, and embrittlement, to the extent that mechanical stress (such as that encountered when an article made from the thermoplastic material is treated in such a heated environment, buried, and tilled in soil or compost) break the article into minute fragments.

The term "biodegradable" is used herein to denote a material (thermoplastic or non-thermoplastic in nature) characterized by susceptibility to attack from living organisms which are capable of producing enzymes or pH changes that hydrolyze chemical bonds present in the material to form specific decomposition products that can be utilized by the attacking organisms or by other organisms for energy production or synthesis of new compounds. Polymeric materials falling within the term "biodegradable", as employed herein, include polyvinyl alcohol resins, ethylene alcohol resins and polycaprolactone-based resins. In addition, other biodegradable thermoplastic polymers may be employed as the core layer, e.g., the biodegradable graft copolymers of U.S. Pat. No. 4,891,404, incorporated herein by reference.

The biodegradation of certain thermoplastic polymers is well known in the prior art. The microbial degradation of synthetic polymers is discussed at pages 164 to 174 of the text entitled, *Polymer Degradation*, Professor Dr. Wolfram Schnabel, Macmillan Publishing Co., Inc., New York (1981). Polyvinyl alcohol and polycaprolactone polymers are reported to have quite high biodegradation rates. Further, the author discusses the various thermophilic, aerobic microorganisms existing in soil and capable of proliferating at temperatures above about 60° C. (e.g., the numerous bacillus [e.g., calidolactis, pepo therminalis, thermodiastaticus and tostus], actinomyces [e.g., monodiastaticus, spinosporus, thermodiastaticus, thermofuscus and thermophilus] and fungi [e.g., aurantiacus and sulfureum]).

The term "water-soluble" as used herein is meant to denote a material (thermoplastic or non-thermoplastic) characterized by a susceptibility to solvolysis by water which causes the breaking of hetero bonds containing carbon and either O, N, P, S, Si, or halogens either in the main-chain or in pendant chains and/or the breakup of secondary bonding forces such as hydrogen-bonding to render a major amount (greater than fifty (50) weight percent) of the material dissolved in water at temperatures no greater than about 100° F. and preferably no greater than about 120° F. and more preferably no greater than about 140° F., at ambient pressure.

In one embodiment the first outer layer and second outer layer are characterized as thermoplastic materials that are less water soluble than the core layer. These outer layers provide protection from water to the more water soluble core layer and limit dissolution of the core layer in a moist environment. This ultimately extends the physical usefulness in a moist environment of the article for a period longer than the period of use for an article formed from the core layer alone. Further, the first and second outer layers possess photo and/or thermal degradation characteristics. After a predictable time of usefulness in service in the presence of UV light or after thermal influence on an outer layer(s) by the sun or otherwise, the first and/or second outer layers become cracked, comminuted and/or increasingly more porous whereby they effectively lose their moisture protection characteristics for the core layer. As the first outer layer and second outer layers become increasingly porous as a result of photo and/or thermal degradation, the unprotected water soluble core layer material can undergo solubilization (and if biodegradable also undergo biodegradation) as a result of exposure to the surrounding environment. The protodegradation and/or thermal degradation characteristics of the first and second outer layers are preferably brought about by incorporation of a prodegradant material that imparts improved photodegradation and/or thermal degradation characteristics to the first outer layer and second outer layer. Although chemically activated prodegradants may be employed within the scope of this invention, such are not typically employed or preferred owing to the careful balancing of a multiplicity of chemical components required to correctly time the initiation of such a chemically activated degradation. Accordingly, it is preferred to add a prodegradant having its degradation activity activated by UV light or by an elevated thermal environment (such thermal environments are found in composting piles and in some landfills). Finally, the first and second outer layers are preferably further characterized as being substantially less water soluble than the core layer at temperatures between about 100° F. and about 212° F.

In one embodiment of the instant invention the first outer layer and second outer layer may be formed of the same or different thermoplastic materials. Further, the first outer layer or the second outer layer may comprise a multilayered layer. The first and second outer layers may be selected from a wide variety of thermoplastic materials. In one embodiment the thermoplastic material is selected as at least one material selected from the group consisting of very low density polyethylene; low density polyethylene; linear low density polyethylene (including the 1-butene, 1-hexene and 1-octene copolymers); ethylene-ethyl acrylate, ethylene-methyl acrylate, ethylene-acrylic acid, ethylene-methacrylic acid, ethylene-vinyl acetate, ultra low density polyethylene (e.g., having a density less than 0.915 g/cm³), medium and high density polyethylene, polyolefinic extrudable adhesive resins having anhydride moieties (such as PLEXAR TM available from the USI Division of Quantum, Rolling Meadows, Ill., BYNEL TM available from E.I. DuPont DeNemoirs, Wilmington, Del., or ADMER TM available from Mitsui Petrochemical, Houston, Tex.), polypropylene, ethylene-propylene rubbers, poly-1-butene, polyisobutylene, poly (4-methyl pentene), polyesters, polyamides (including polyamides such as nylons, including nylon-6/6, nylon-5/8 and nylon-6/10 and polycaproamide), oriented polyethylenes, and mixtures thereof, and the like. Oriented polyethylenes are well known in the art. For example, polyethylene materials may be oriented in a direction by physical stretching or by addition of various ring compounds, such as disclosed in U.S. Pat. No. 4,722,970.

In a more general sense, the polyethylene polymers generally referred to above and useful herein as resins (alone or with other thermoplastic resins) for the first outer layer and second outer layer include the homopolymer and those copolymers obtained by the copolymerization of ethylene with any monomer containing the

groups which will copolymerize with the ethylene and form thermoplastic copolymers. Illustrative of such copolymerizable monomers are the alpha olefins (in minor amounts) containing up to 18 carbon atoms such as propylene, 1-butene; isobutene, and 1-pentene; halogenated olefins such as chloroprene, tetrafluoroethylene, chlorotrifluoroethylene, hexafluoropropylene; vinyl aryls such as styrene, o-methoxystyrene, p-methoxystyrene, m-methoxystyrene, o-nitrostyrene, p-nitrostyrene, o-methylstyrene, p-methylstyrene, m-methylstyrene, p-phenylstyrene, o-phenylstyrene, m-phenylstyrene, vinyl naphthalene, and the like, vinyl and vinylidene halides, such as vinyl chloride, vinyl fluoride, vinylidene chloride, vinylidene fluoride, vinylidene bromide, and the like; vinyl esters such as vinyl formate, vinyl acetate, vinyl propionate, vinyl butyrate, vinyl chloroacetate, vinyl chloropropionate, vinyl benzoate, vinyl chlorobenzoate, and the like, acrylic and alpha-alkyl acrylic acids, their alkyl esters, their amides and their nitriles such as acrylic acid, chloracrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, methacrylamide, N-methyl methacrylamide, N,N-dimethyl methacrylamide, acrylonitrile, chloroacrylonitrile, methacrylonitrile, ethacrylonitrile, and the like; maleic and fumaric acid and their anhydrides and alkyl esters such as maleic anhydride, dimethyl maleate, diethyl maleate and the like; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone, and butadiene, isoprene, cyclopentadiene, hexadiene-1,6 norbornadiene, dicyclopentadiene, and the like; also vinyl pyridine, N-vinyl carbazole, N-vinyl pyrollidine, acrolein, vinyl alcohol, vinyl acetal, vinyl butyral, and the like. Other monomers which may be interpolymerized with ethylene include, carbon monoxide and formaldehyde.

In one embodiment the first and second outer layers may comprise PLEXAR ® which is described at column 3, lines 1 to 26 of U.S. Pat. No. 4,254,169 as a modified polyolefin blend as disclosed in U.S. Pat. Nos. 4,087,587 and 4,087,588. U.S. Pat. Nos. 4,087,587, 4,087,588 and 4,254,169 are incorporated herein by reference thereto. PLEXAR ® modified polyolefin blends having a density of 0.91–0.96 gm/cm³ and a melt index of 0.3–13 gm/10 min. are particularly well suited for use herein in the formation of the first outer layer and/or the second outer layer or a component thereof. U.S. Pat. No. 4,254,169 describes multilayer structure comprising a barrier layer of a substantially pure polymer or copolymer of vinyl alcohol adhered directly to a layer of a modified polyolefin which consists essentially of a polyolefin polymer or copolymer blend with a graft copolymer of polyethylene and an unsaturated fused ring carboxylic acid anhydride.

In one embodiment, preferable for a film employed to manufacture a composting bag, the first outer layer and second outer layer may be a film composition as disclosed in U.S. Pat. No. 3,935,141, incorporated herein in its entirety by reference. Further, the incorporation of an auto-oxidative polymer is clearly optional when the teachings of U.S. Pat. No. 3,935,141 are followed herein to form a useful first outer layer and a useful second outer layer owing to the thickness of such layers in relation to the total thickness of the multilayer degradable thermoplastic article of the instant invention.

The core layer is preferably a thermoplastic material selected from the various water-soluble and/or biodegradable polyvinyl alcohols. Representative of thermoplastic polyvinyl alcohol resins employable herein as the core layer include the VINEX TM thermoplastic polyvinyl alcohol copolymer resins available from Air Products and Chemicals, Inc. Polymer Chemicals Division, Allentown, Pa. Representative physical and thermal properties for such polyvinyl alcohol resins (taken from Brochure No. 152-812, published 1988 by Air Products and Chemicals, Inc.) are:

| VINEX 2025 Resin | |
|---|---|
| Melt Index,[1] g/10 mins | 24 |
| Melting Range, °C. | 160–195 |
| Glass Transition, °C. | 29 |
| Melt Viscosity,[2] no poise | 14,900 (195° C.) |
| | 4,560 (210° C.) |
| Extrusion Blown Film[3] | |
| Tensile Strength (Break) | 3200 PSI |
| Elongation (Break) | 320% |
| Water Solubility[4] | |

| VINEX 2025 Resin | |
|---|---|
| Breakup | 20 sec |
| Total Solubility | 45 sec |

[1] Melt Index is measured at 230° C - 2160 g
[2] Melt Viscosity at zero shear.
[3] Film conditioned at 23° C /50% R.H.
[4] Measured on 1-1.5 mil thick film in 25° C water under slight agitation.

Representative polycaprolactone-based polymers e.g., (epsilon and beta caprolactone) include the TONE ® Polymers P-300 and P-700 caprolactone polymers available from Union Carbide Corporation, Danbury, Conn. Polymers P-300 and P-700 are homopolymers of polycaprolactone and are represented by the structure

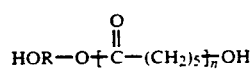

$$HOR-O+C-(CH_2)_5]_n OH$$

wherein the average degree of polymerization (n) is about 95 for TONE ® P-300 and 400 for TONE P-700. The non-toxic and biodegradable, chemical and physical properties of these polycaprolactones) are set forth in Brochure No. F-60456, published June 1988 by Union Carbide Corporation, incorporated herein by reference.

In a further embodiment the first outer layer and second outer layers comprise a linear low density polyethylene having a density between about 0.915 grams per cubic centimeter and up to but less than 0.945 grams per cubic centimeter, preferably between about 0.915 grams per cubic centimeter and about 0.930 grams per cubic centimeter (g/cm$^3$), and the core layer comprises a polyvinyl alcohol homopolymer characterized by a degree of hydrolysis (defined as the percentage of acetate functional groups that have been converted to hydroxyl groups by hydrolysis) from 84-95% and containing an external plasticizer to permit conventional thermoplastic extrusion. Examples of such external plasticizers include any from the group consisting of mono-, di-, and tri-glycols, polyethylene glycols, glycerol, propane diols, butane diols, pentane diols, hexane diols, hexane triols, neopentyl glycol, trimethylol propane, and fatty acid monoglycerides as MOWIAL grades available from Hoechst Celanese Corporation, Performance Products Division, Portsmouth, Va. The core layer may also be a polyvinyl alcohol copolymer characterized by a degree of hydrolysis from 84-88% and having an internal plasticizer to permit conventional thermoplastic extrusion comprising grafted comonomer segments comprising oligomeric polyethylene glycol of 1 to about 30 repeating units in addition to a few weight percent of an external plasticizer, such as glycerin, e.g., VINEX ™ grades which are available from Air Products and Chemicals, Inc., Allentown, Pa. In this embodiment it will typically be advantageous to employ a tie or adhesive layer to effectively bind the first and second outer layers to the core layer. Well known tie layers include ethylene vinyl acetate, PLEXAR ®, BYNEL ™, ADMER ™ ethylene acrylic acid, ethylene methacrylic acid, ionomers (including SURLYN ®, available from DuPont Company, Wilmington, Del. 19898), ethylene-carbon monoxide copolymers, and the like.

In a further embodiment the first outer layer and second outer layer may be a prodegradant-containing modified polyolefin, e.g., PLEXAR ®, and the core layer may be selected from the group consisting of polyvinyl alcohol, polycaprolactone, polyethylene oxide, and mixtures thereof.

The thermoplastic materials employed herein may also contain heretofore other optional additive materials in the first outer layer, second outer layer and/or core layer including fillers (such as starch, paper pulp, calcium carbonate, silicas, talc, kaolin, mica, Wollastinite, zeolites, carbon black, fiber glass, cellulosic materials, crystalline cellulose and mixtures thereof); colorants (e.g., pigments and/or dyes), slip agents, curing agents, antioxidants, lubricants, antiblockers and the like. In addition, the multilayer degradable thermoplastic article can employ a biodegradable additive in the first and/or second outer layers and/or the core layer. Representative of such biodegradable additives are polycaprolactone, starch, modified starch i.e., starch derivatives, sugars, natural rubbers, natural gums, paper pulp and mixtures thereof to name a few.

The relative amount of each layer in the multilayer degradable thermoplastic article of this invention may be characterized by either the relative weight ratios of the respective layers or by reference to their relative thickness. When the multilayer degradable thermoplastic article is a multilayer film as may be employed in the manufacture of a bag film such will typically be between about 0.1 mil and about 5.0 mils thick, preferably between about 0.5 mil and about 3 mils and more preferably between about 0.5 mil and about 2.0 mils. In an embodiment having three layers, i.e., an A:B:C or A:B:A layered structure, the weight ratio of the first outer layer to the core layer to the second outer layer is between about 1:50:1 and about 10:1:10, preferably between about 1:10:1 and about 2:1:2. The aforementioned reference to an A:B:A or A:B:C multilayer article does not include any reference to tie or adhesive layers which may be present between the layers of an A:B:A or A:B:C multilayer article. In a general sense, it is preferred if the core layer comprises greater than 50 weight percent of the total weight of the multilayer article.

The first outer layer and second outer layer preferably contain an effective amount of a prodegradant which is preferably any metal salt, organic or inorganic, wherein at least one metal is a polyvalent transition metal, and preferably is an organic salt of a polyvalent transition metal and most preferably is an organic salt of a polyvalent transition metal wherein the metal is one wherein electron transfer occurs in the 3d sub-shell or the 4f sub-shell. The transition metals referred to are as defined in the Periodic Chart at the terminal leaf page of the Handbook of Chemistry and Physics, The Chemical Rubber Co., 49th edition (1968-69). They are those elements in the Fourth Period having atomic numbers of 21 to 30, in the Fifth Period having atomic numbers of 39 to 48, and in the Sixth Period having atomic numbers of 57 to 71. Among the specific-transition metals wherein electron transfer occurs in the 3d sub-shell one can mention V, Cr, Mn, Fe, Co, Ni, Cu, Zn, Zr and Ag of the Fourth and Fifth Periods, among the transition metals wherein electron transfer occurs in the 4f sub-shell are Ce or Pr in the Sixth Period.

Suitable polyvalent transition metal inorganic salts pursuant to this invention are by way of example, iron chloride, zinc chloride, mercurous chloride, chromium trichloride, copper nitrate, copper sulfate, cobalt chloride, nickel sulfate, iron sulfate, iron bromide, zinc sulfate, mercuric sulfate, and the like.

Typically the organic salt is the octoate, napthenate, acetate, stearate or acetylacetonoate metal salt, preferably the stearate, but it need not be so limited and other organic groups may be employed if desired. The stearate salts of iron, manganese and cerium have been found useful owing to their efficacy and their commercial availability.

Illustrative of suitable organic salts of polyvalent transition metals one can mention merely by way of examples, cobalt acetate, cobalt octoate, cobalt napthenate, iron napthenate, iron octoate, lead stearate, lead octoate, zirconium stearate, cerium stearate, cerium octoate, manganous stearate, manganous oleate, manganous dodecyl acetoacetate, cobalt acetyl acetonate, cobaltous acetate, cobaltous oleate, cobaltous stearate, cobaltous dodecyl acetoacetate, cupric stearate, cupric oleate, ferric acetate, zinc octoate, zinc napthenate, iron distearate, potassium permanganate, potassium trioxalatocobaltate (III), trisethylenediaminecobalt (III) chloride, sodium hexanitrocobaltate (III), potassium hexacyanocobaltate (III) and the like.

Polyvalent transition metal salts pursuant to the practice of this invention may be used individually or in combination. It has been found that certain polyvalent transition metal salts promote photodegradation and/or thermal degradation more so than the equivalent amount of another polyvalent transition metal salt. The use of stearate salts of manganese and cerium, preferably cerium, have been found to provide advantageous results when the multilayer article is formed into a bag for use in composting.

The polyvalent transition metal salts are typically present in effective amounts of between about 0.01 and about 3.0 weight percent of the metal salt(s), based on the weight of the particular layer of the multilayer article. Preferably the metal salt(s) is present in an effective amount between about 0.1 and about 1.5 and most preferably in amounts of between about 0.3 and about 1.0 weight percent, based on the weight of the particular layer. The fact that only such small amounts of the polyvalent transition metal salt(s) are required to give suitable degradation characteristics to the multilayer article is an attractive feature of this invention insofar as such small amounts of the polyvalent transition metal(s) does not generally adversely effect the physical properties of the degradable thermoplastic material during use and prior to disposal.

An antioxidant may be present in the thermoplastic material in an effective stabilizing amount sufficient to stabilize the thermoplastic composition against oxidative degradation for the useful life of the multilayer article and is generally present in an effective amount between about 0.001 and about 1 weight percent preferably between about 0.0025 and about 0.1 weight percent, based on the weight of total degradable thermoplastic composition of the layer in which the antioxidant is present. Representative antioxidants employable herein are disclosed in U.S. Pat. No. 3,935,141, at column 7, line 62 to column 10, line 13, incorporated herein by reference. Commonly employed antioxidants include IRGANOX 1010, IRGANOX 1076, IRGANOX 1093, as described in U.S. Pat. No. 3,935,141.

It is well known that almost all non-barefoot ethylene polymers contain minute amounts of antioxidant as manufactured, but this amount is normally not sufficient to stabilize the ethylene polymer composition of this invention when a prodegradant is added. Accordingly, additional amounts of antioxidant are often required to balance the stability required for use of the multilayer article against the desired degradation of the article when such is discarded after use.

In certain embodiments of this invention the antioxidant need not be present or need be present in only minute amounts. In these two cases the first outer layer will degrade very rapidly upon exposure to natural environmental elements (UV light, rain, oxygen, wind, etc.). This rapid degradation may be important in a product application where a product prior to use is sealed in a protective covering which eliminates attack by such elements, particularly sunlight, rain and oxygen. When sought to be used the particular product is removed from the protective covering, used as required within a pre-specified time, and discarded for exposure to the environment for rapid degradation. For such rapid degradation it has been found that concentrations below about 0.0025 percent by weight of antioxidant can be used to provide minimal antioxidant activity. In a further embodiment an antioxidant is present in the first outer layer and second outer layer (in the same or differing amounts) but no antioxidant or a substantially lesser amount is present in the core layer. In a further embodiment the amount of prodegradant in the first outer layer is greater than that present in the second outer layer which in turn is greater than the amount of prodegradant in the core layer. By correlating the concentration of prodegradant in this manner the rate of degradation of the layers of the multilayer article can be made to respond to different environmental conditions which each layer may experience during various types of degradation processes. For example, when a bag is employed in landfill and composting environments the first outer layer initially experiences direct environmental contact. The first outer layer is preferably more resistant to degradation than the second outer layer since the first outer layer may be subjected to harsher environmental conditions and, accordingly, preferably contains a greater amount of prodegradant or lesser amount of antioxidant. For example, when the multilayer article is a multilayer bag the second outer layer comprises the inner surface of the bag and is somewhat protected from UV light, water and oxygen by the first outer layer and core layer. After the first outer layer and core layer undergo degradation it is advantageous to have the second outer layer degrade at an increased rate (as compared to the first outer layer), since the bag is now at the point of its useful life where degradation is the most desired function of the thermoplastic material from which the bag is formed.

It is recognized that certain suitable antioxidants may offer additional benefits which may give further dimension to this invention. For example, certain antioxidants, such as thioureas, are water soluble and may be well suited for use in the core layer when a prodegradant is added to the core layer. Polymer compositions containing thioureas may be utilized for long periods in a relatively dry environment and then after exposure to aqueous environmental elements, such as rain or fog, leaching of the thioureas occurs rendering the polymer compositions more actively degradable. Another example is wherein the antioxidant is biodegradable, such as is observed for certain thioether esters, as for example dilauryl thiodipropionate and the like. In this instance bacteria found in the environment will consume the antioxidant in the polymer composition, rendering the polymer composition more actively degradable. Still another example is wherein the antioxidant is volatile, such as observed for mercaptomalic acid, and certain urea derivatives such as 1,1-diethyl urea. Because of its volatility such an antioxidant would generally be applied to the core layer after fabrication by immersion in a solution of the antioxidant or by the use of a roller coater or spray gun or other suitable application technique. The core layer would then be formed into a multilayer article by placement between the first and second outer layers. Such volatile antioxidants may also be used in conjunction with less volatile antioxidants. The volatile antioxidants upon discard to the environmental elements and degradation of the first and/or second outer layers volatilize so as to render the core layer more actively degradable. A further example is wherein the antioxidant is heat stable but (ultraviolet and/or infrared) light unstable, such as alpha-phenylindole and diphenyl thiourea. A core layer employing antioxidants of this nature may be advantageous since the core layer is for all practical purposes present in a dark environment between the first outer layer and second outer layer which when exposed to sunlight will readily start to degrade.

One area of particular interest herein is the use of the instant multilayer degradable thermoplastic articles for use in forming bags for use in composting applications. In this use the multilayered degradable thermoplastic bag contains an organic material. The bag and organic material are shredded to reduce the overall size of the organic material and to shred the bag into pieces smaller than the initial bag. The shredded material is composted under effective composting conditions for an effective period of time. The effective period of time for composting is preferably a period of time that does not substantially exceed the effective composting period of time which would have been required for the organic material if the shredded multilayer degradable thermoplastic bag were not present, i.e., sans the shredded multilayer degradable thermoplastic bag. Further, after composting under effective composting conditions for an effective period of time the tensile load of the multilayer degradable thermoplastic film has preferably decreased to less than 50 percent of the tensile load of the original value prior to having undergone composting.

DESCRIPTION OF SAMPLE PREPARATION

All multilayer film samples used herein in the following examples were prepared as follows unless otherwise stated. Three-layer films were extruded by the blown film process using an A:B:A layer configuration. The blown film processed used one 2 inch extruder to feed the first and second outer layers, designated "A", and one 1½ inch extruder to feed the core layer, designated "B", through a three layer feed block and 6 inch annular die with a 130 mil die gap. The bubble blow up ratio was about 2.5:1 and frost line height ranged from 8 to 12 inches depending on cooling requirements necessary for maintenance of a stable bubble at 45-50 fpm (feet per minute) line speed. Nominal film thickness ranged from 1.0 to 1.5 mils and the layer ratio A:B:A was from 1:4.7:1 to 1:1:1 depending on film sample, as shown in the following examples.

In the following examples: PVOH refers to VINEX TM 2025 polyvinyl alcohol copolymer resin available from Air Products and Chemicals, Inc., Allentown, Pa.; LLDPE refers to DFDA 7047 pelleted 1-butene LLDPE (density 0.918 g/cm$^3$, 1.0 MI) available from Union Carbide Corporation, Danbury, Conn.; PLEXAR TM refers to PLEXAR TM 169 LDPE-based adhesive resin (specific density of 0.92, 2.6 MI) available from USI Div of Quantum Chemical Corporation, Cincinnatti, Ohio; Fe(St)$_2$ refers to ferrous stearate obtained from Mooney Chemicals, Inc., Cleveland, Ohio; EVA (33) and EVA (8.9) refer to ELVAX TM 3120 and ELVAX TM 3128 poly(ethylene-vinyl acetate) containing 33 mol % and 8.9 mol % vinyl acetate, respectively, both available from E.I. DuPont de Nemoir & Co. (Inc.), Wilmington, Del.; PCL refers to TONE TM P767E polycaprolactone available from Union Carbide Corporation, Danbury, Conn.; 32% C$_2$EVOH refers to EVAL TM EP-F101 ethylene vinyl alcohol copolymer resin containing 32 mol % ethylene (1.3 MI, DSC melt pt. peak 181° C.); and 44% C$_2$ EVOH refers to EVAL TM EP-E105 ethylene vinyl alcohol copolymer resin containing 44 mol % ethylene (5.5 MI, DSC melt pt. peak 164° F.). Both EVAL TM grades are available from EVALCA, Omaha, Nebr. Nylon-6/6,6 refers to ULTRAMID TM C35 nylon-6/6,6 copolymer available from BASF-Badische Corporation, Bridgeport, N.J. POLYCLEAN TM -C refers to a 40% starch-containing LLDPE concentrate available from Archer Daniels Midland Co., Decatur, Ill. EMMA TM refers to NUCREL TM 1202 HC ethylene methacrylic acid copolymer containing 12% acid (1.5 MI) available from E.I. DuPont de Nemours & Co. (Inc.), Wilmington, Del. Reference to "Leaf Bag" paper is to 2-ply kraft paper of approximately 15 grams/sq ft weight available from Union Camp Corporation, Wayne, N.J. ECOSTAR TM and ECOSTAR TM PLUS refer to 43% starch-containing LLDPE concentrates available from St. Lawrence Starch, Missisauga, Ontario, Canada.

DESCRIPTION OF TEST METHODS

All oven aging of samples was conducted in mechanically convected environmental test ovens (ETO) capable of maintaining temperatures to within one degree centigrade of the selected temperature such as an oven available as Hotpack Model 217502 mid-temperature range ETO from Hotpack Corporation, Philadelphia, Pa.

All aging by exposure to light was conducted by exposing a 4"×10" sample to a 20 watt UVA 340 bulb for a selected time period, as stated in the examples hereinafter. Tests were conducted per ASTM Test Method G53 (without use of the darkness/condensation cycle) in a QUV Tester as available from Q Panel Corporation, Cleveland, Ohio.

The measurement of the tensile physical properties was conducted on an Instron Tensile Tester (available from Instron Corporation, Canton, Mass.) according to ASTM Test Method D882-83 (Method A).

EXAMPLE 1

A number of sets of three layer film samples were prepared from multilayer films having a first outer layer and a second outer layer and a core therebetween by blown film extrusion, as above described. The samples in each set were numbered 1-4 and had compositions as shown in Table 1. A first set of samples was physically stressed to simulate environmental mechanical conditions which would result in cracks or perforations in the first and second outer layers. As a result of these cracks and perforations the core layer becomes susceptible to contact with environmental conditions. The first set of samples was physically stressed by lightly scratching the external surfaces of the first and second outer layers with sandpaper (Norton E-Z FLEX METALITE TM cloth/aluminum oxide K224 400-J) with sufficient pressure to score the surfaces. A second set of samples was physically stressed by exposing the outer layers of the film sample to a 20 watt UVA 340 bulb for 200 hours at 55° C. in a QUV tester, above-described, to induce photodegradation. A set of untreated samples were retained as a control.

For each sample in a sample set, the sample was dried at 160° F. for one (1) hour in a Fisher Isotemp Junior Model forced air oven, then removed and weighed on a Mettler AE-160 Digital Analytical Balance with precision to 0.1 mg. Each sample was then immersed in 150 ml of 25° C. distilled water contained in a 250 ml glass beaker equipped with a one inch magnetic stir bar rotating at 12 rotations per second. After immersion in the distilled water for the time period shown in Table 1, the sample was collected on Whatman Qualitative No. 4 filter paper, then dried and weighed, as hereinbefore described. The weight of the sample that passed through the filter paper represents the amount of sample (calculated as a percentage of the total sample weight) that was solubilized by water or fragmented to particles minute enough to pass through the pore size (20-25 micron) of the No. 4 filter paper.

It is evident from comparison of the results of Table 1 that the first and second outer layers of the control sample acted to protect the core layer from dissolution by water and that once the outer layer(s) was damaged through external physical stresses (i.e., physical stressing by mechanical action and/or UV exposure) that the outer layer(s) were no longer effective in preventing attack by environmental conditions on the core layer (in this instance the environmental condition is water). In addition, the dramatic effect on dissolution of the core layer by UV exposure on the outer surfaces of the film demonstrates the effect one would expect to see as a result of exposure to sunlight.

tions. The effective conditions for composting are well known to those in the composting field as discussed in "GARBAGE SOLUTIONS", Marian R. Chertow, Chapter 4, (1989); "LEAF AND YARD WASTE COMPOSTING MANUAL", prepared for National Corn Growers Association, 1000 Executive Parkway, Suite 105, St. Louis, Mo. 63141 (1989); and "THE BIOCYCLE GUIDE TO YARD WASTE COMPOSTING", the JG Press, Inc., Emmaus, Pa. (1989), such incorporated herein by reference.

The composting medium consisted of one cubic yard of ground dry leaves with urea and water added to adjust the carbon nitrogen ratio at 30:1 and moisture content to about 55 wt. %. The medium was placed in an insulated compost chamber equipped with a 10 cubic foot per minute (cfm) air blower to provide aeration and cooling of the compost medium. The composting protocol for the compost pile for the six (6) week test period was to adjust air flow through the compost pile so as to maintain a temperature representative of large-scale commercial yardwaste composting piles as reported in the prior art literature, e.g., between about 130° F. and 140° F. as measured at the hottest point in the pile. The samples, 2.5"×8" single sheet samples, were oriented vertically in the compost chamber with a 4 inch spacing between samples, horizontally, and 8 inch spacings between layers vertically.

The multilayer film samples were left physically undisturbed until the end of the six (6) week test period, at which time the compost chamber was opened and the samples removed and cleaned by carefully rinsing with distilled water, and then dried and pre-conditioned by having each sample sit at ambient humidity (45% to 55% relative himidity) overnight for the same period. The evaluation of tensile and elongation was conducted per ASTM Test D882-83 (Method A). The percent load and percent elongation retained by each sample as com-

TABLE 1

| | A:B:A BLOWN FILM[1] | | PERCENT DISSOLUTION OF TOTAL FILM[1] STRUCTURE AFTER WATER IMMERSION | | |
|---|---|---|---|---|---|
| SAMPLE NO. | 1ST & 2ND OUTER LAYERS (0.30 MILS)[3] | CORE LAYER (0.80 MILS)[3] | CONTROL[2] (7.5 HRS.)[4] | PHYSICALLY STRESSED (7.5 HRS.)[4] | UV EXPOSURE (4 HRS.)[4] |
| 1 | LLDPE + 3000 ppm Fe(St)₂ | PVOH | 0.0 | 27.8 | 52.3 |
| 2 | LLDPE + 50% TIE RESIN + 3000 ppm Fe(St)₂ | PVOH | 0.0 | 32.3 | 61.6 |
| 3 | LLDPE + 15% EVA(33) + 3000 ppm Fe(St)₂ | PVOH | 3.9 | 33.5 | 44.7 |
| 4 | EVA (8.9) + 30% PCL | PVOH | 8.5 | 21.5 | 31.5 |

[1]Percent Dissolution as a weight percent. LLDPE is linear low density polyethylene. TIE RESIN is PLEXAR 169; PCL is Polycaprolactone); ppm is parts per million. Values are average of three samples. PVOH is polyvinyl alcohol; EVA is a ethylene vinyl acetate polymer; FE(ST)₂ is iron stearate.
[2]Control
[3]Thickness in mils of first outer layer, second outer layer and core layer.
[4]Hours samples placed in water.

EXAMPLE 2

A number of layer samples of three layer A:B:A films having first and second outer layers with a core therebetween were prepared as described in Example 1. The multilayer film samples, designated as Samples Nos. 5-22 in Table 2, had the compositions shown in Table 2.

The samples were tested in triplicate by placement in a compost pile for compost testing over a six (6) week test period to determine the degradability of each film sample when subjected to common composting condipared to the load and elongation of the original samples (control samples) prior to introduction into the compost pile are set forth in Table 2. It is evident from Table 2 that the multilayer film samples in accordance with the instant invention, have undergone a significant loss in tensile strength indicating that significant degradation of the film samples is occurring as a result of the composting treatment.

Each value given in Table 2 is an average of three samples. The numbers in parenthesis under the heading "A:B:A FILM DESCRIPTION" denote the thickness of the particular film layer, i.e., "A" or "B", given in mils.

the multilayer degradable thermoplastic article of this invention.

TABLE 2

COMPOST TESTING OF A:B:A FILMS

| SAMPLE NO. | A:B:A FILM DESCRIPTION[1] | % RETAINED IN COMPOST | | | |
|---|---|---|---|---|---|
| | | SAMPLE 1 | | SAMPLE 2 | |
| | | LOAD | ELONG | LOAD | ELONG |
| 5 | LLDPE + 50% PLEXAR + 3000 ppm Fe(St)$_2$ (0.50)/PVOH (0.50)/ SAME (0.50) | 53 | 53 | 60 | 59 |
| 6 | PLEXAR + 3000 ppm Fe(St)$_2$ (0.50)/PVOH (0.50)/ SAME (0.50) | 71 | 16 | 88 | 63 |
| 7 | 32% C$_2$ EVOH + 2000 ppm Fe(St)$_2$ (0.30)/PVOH (0.80)/ SAME (0.30) | 60 | 9 | 51 | 13 |
| 8 | 44% C$_2$ EVOH + 2000 ppm Fe(St)$_2$ (0.30)/PVOH (0.80)/ SAME (0.30) | 82 | 8 | 53 | 11 |
| 9 | NYLON-6/6.6 + 1200 ppm Fe(St)$_2$ (0.30)/PVOH (0.80)/SAME (0.30) | 54 | 22 | 61 | 13 |
| 10 | NYLON-6/6.6 (0.30)/PVOH (0.80)/ SAME (0.30) | 48 | 23 | 56 | 26 |
| 11 | NYLON-6/6.6 (0.15)/PVOH (0.70)/ SAME (0.15) | 41 | 21 | 50 | 21 |
| 12 | NYLON-6/6.6 + 15% PCL (0.30)/ PVOH (0.80)/SAME (0.30) | 51 | 25 | 49 | 14 |
| 13 | LLDPE + 50% PLEXAR + 1500 ppm Fe(St)$_2$ (0.50)/PVOH (0.50)/ SAME (0.50) | 100 | 6 | 100 | 9 |
| 14 | LLDPE + 6% STARCH (POLYCLEAN-C) + 10% EMMA (0.30)/PVOH (0.80)/ SAME (0.30) | 34 | 100 | 26 | 100 |
| 15 | 32% C$_2$ EVOH (0.30)/PVOH (0.80)/SAME (0.30) | 76 | 14 | 73 | 11 |
| 16 | NYLON-6/6.6 + 3600 ppm Fe(St)$_2$ (0.30)/PVOH (0.80)/SAME (0.30) | 51 | 18 | 45 | 13 |
| 17 | LEAF BAG PAPER (KRAFT PAPER) | 10 | — | 10 | — |
| 18 | NYLON-6/6.6 + 6% STARCH (POLYCLEAN-C) (0.30)/PVOH (0.80)/SAME (0.30) | 36 | 9 | 41 | 16 |
| 19 | NYLON-6/6.6 + 12% STARCH (POLYCLEAN-C) (0.30)/PVOH (0.70)/SAME (0.15) | 50 | 10 | 52 | 12 |
| 20 | NYLON-6/6.6 + 6% STARCH (ECOSTAR) (0.30)/PVOH (0.80)/SAME (0.30) | 42 | 11 | 41 | 12 |
| 21 | NYLON-6/6.6 + 6% STARCH (ECOSTAR PLUS) (0.30)/PVOH (0.80)/SAME (0.30) | 60 | 9 | 16 | 62 |
| 22 | NYLON-6/6.6 + 30% PCL (0.30)/ PVOH (0.80)/SAME (0.30) | 22 | 3 | 24 | 3 |

[1] Abbreviations are as set forth in the specification section entitled "DESCRIPTION OF SAMPLE PREPARATION". The designation of "SAME" on the A/B/A film description for each sample denotes that the first outer layer and second outer layer are the same film material.

EXAMPLE 3

Film samples having a thickness of 1.2 mil and having the composition of an individual outer layer of a multi-layer film sample, as discussed in examples 2 and 3, were extruded under the same extrusion conditions as the multilayer film structures of examples 1 and 2, except that instead of being an A:B:A structure the film was an A:A:A structure (i.e. three (3) identical film layers were employed, thus representing a single homogenous three layer film structure). Several samples were evaluated as in a compost pile with the results being set forth in Table 3. The results of the samples tested are numbered Sample Nos. 23-76. Sample No. 27 is a 1.2 mil slot cast VINEX ™ 2025 PVOH monolayer film sample. VINEX ™ 2025 was obtained from Air Products and Chemicals Inc., Allentown, Pa. and is representative of a water soluble, biodegradable core layer employable of The film samples were treated in a compost pile according to the procedure of Example 2 at composting temperatures ranging from 130°-140° F. for a period of six (6) weeks. At the end of the six (6) week period the compost chamber was opened and the samples removed (to the extent such were capable of removal in that such had not degraded to the point of not being physically removable), cleaned by carefully wiping with a damp towelette, and pre-conditioned as described in Example 2 prior to evaluation of tensile load and elongation per ASTM Test Method D882-83 (Method A).

The percent load and elongation retained for each sample are calculated by comparison to the load and elongation of the original (control) samples which had not been placed into the compost pile. It is evident from the results shown in Table 3 that the outer layer material comprising a transition metal carboxylate blended into linear low density polyethylene film samples underwent a more rapid rate of thermal degradation than the control sample, Sample No. 23, containing no metal salt prodegradant. This more rapid thermal degradation can be seen from the substantially reduced tensile load and elongations reported in Table 3. Samples 23 to 26 were substantially degraded and would be expected to fragment under mechanical stress such as that encountered if the samples were tilled into soil or at a compost pile site. It is also evident that the PVOH film layer, Sample No. 27, was readily degradable in a compost pile, since after six (6) weeks the PVOH sample was not distinguishable from the surrounding compost matter.

Compost testing of the individual components of the multilayer article of this invention, as done in this example, provides evidence of the degradation mechanism of the multilayer film and of the degradability of the multilayer thermoplastic article itself. A multilayer article according to the instant invention will satisfactorily degrade according to its intended degradation profile as the first outer layer and second outer layer initially act to protect the core layer from environmental attack, as shown in Example 1. Once the first outer layer and/or second outer layer is physically damaged through external stresses, such as photo or thermal degradation or mechanical rupturing, the next phase of degradation of the multilayer article commences. As photodegradation and/or thermal-degradation weakens the outer layers such that they no longer will withstand encountered environmental stresses, the outer layers, through the course of fragmentation, lose their effectiveness in providing protection from environmental conditions to the water-soluble and/or biodegradable core layer. When this occurs the core layer of the multilayer article will rapidly dissolve in water and/or biodegrade. As the various layers of the multilayer article continue to degrade and fragment, the fragments of the degrading multilayer article will continue to get smaller and smaller and become an indistinguishable part of the final composting material.

TABLE 3

COMPOST TESTING OF MONOLAYER FILMS

| SAMPLE NO. | 1.2 MIL MONOLAYER[1] FILM DESCRIPTION | % RETAINED IN COMPOST | | | |
|---|---|---|---|---|---|
| | | SAMPLE 1 | | SAMPLE 2 | |
| | | LOAD | ELONG | LOAD | ELONG |
| 23 | LLDPE (CONTROL) | 100 | 100 | 95 | 93 |
| 24 | LLDPE + 6000 ppm COBALT STEARATE[2] | 20 | 0 | 14 | 0 |
| 25 | LLDPE + 4500 ppm CERIUM STEARATE[2] | 63 | 87 | 30 | 5 |
| 26 | LLDPE + 3000 ppm ZIRCONIUM STEARATE[2] | 57 | 63 | 55 | 55 |
| 27 | PVOH | BOTH SAMPLES COMPLETELY DEGRADED (PHYSICALLY INDISTINGUISHABLE FROM COMPOST MATERIAL) | | | |

[1] Abbreviations are as set forth in the specification entitled, "DESCRIPTION OF SAMPLE PREPARATION".
[2] Available from Mooney Chemicals Inc., Cleveland, Ohio. The metal content of these particular stearate salts is: the Cobalt stearate is 9.5 wt. percent cobalt, the Cerium stearate is 12.0 wt. percent cerium, and the Zirconium stearate is 14.0 wt. percent zirconium.

I claim:

1. A multilayer degradable thermoplastic article having at least three layers of thermoplastic material comprising a first outer layer, a second outer layer, and a core layer, wherein the first outer layer and second outer layer are characterized as containing an effective amount of a prodegradant to promote photodegradation and/or thermal degradation and said core layer is characterized as being more water soluble and/or more biodegradable than said first outer layer and said second outer layer.

2. A multilayer degradable thermoplastic article according to claim 1 wherein said core layer is substantially more water soluble and/or more biodegradable than said first outer layer and said second outer layer.

3. A multilayer degradable thermoplastic article according to claim 1 or claim 2 wherein said first outer layer and said second outer layer are selected from the group consisting of polyethylene, polypropylene, polybutene, polymethylpentene, nylon, polyolefinic adhesive resins, ethylene-vinyl acetate copolymers, ethylene acid copolymers, ethylene-ethyl acrylate, ethylene-methyl acrylate, polyesters, ethylene propylene rubbers, and mixtures thereof and said core layer is selected from the group consisting of polyvinyl alcohol, ethylene-vinyl alcohol, polycaprolactone, polyethylene oxide, and mixtures thereof.

4. A multilayer degradable thermoplastic article according to claim 1 wherein said first outer layer and said second outer layer comprise a modified polyolefinic adhesive resin, said core layer comprises a water soluble, biodegradable polyvinyl alcohol and said prodegradant is cerium stearate.

5. A multilayer degradable thermoplastic article according to claim 3 wherein said first outer layer and said second outer layer comprise a nylon and said core layer comprises a polyvinyl alcohol.

6. A multilayer degradable thermoplastic article according to claim 3 wherein said first outer layer and said second outer layer comprise a low density polyethylene and said core layer comprises a blend of polyvinyl alcohol and at least one biodegradable additive.

7. A multilayer degradable thermoplastic article according to claim 6 wherein said biodegradable additive is selected from the group consisting of polycaprolactone, starch, starch derivatives, natural proteins, cellulosic materials, sugars, natural rubbers, natural gums, and mixtures thereof.

8. A multilayer degradable thermoplastic article according to claim 4 wherein said first outer layer and said second outer layer comprises modified polyolefin resin and said core layer comprises a blend of water soluble, biodegradable polyvinyl alcohol and a biodegradable polycaprolactone.

9. A multilayer degradable thermoplastic article according to claim 6 wherein said first outer layer and said second outer layer comprise a linear low density polyethylene and said core layer comprises a water soluble, biodegradable polyvinyl alcohol.

10. A multilayer degradable thermoplastic article according to claim 1 wherein said first outer layer and said second outer layer contain an effective amount of at least one organic salt of a polyvalent transition metal as said prodegradant and said core layer comprises a water soluble, biodegradable polyvinyl alcohol.

11. A multilayer degradable thermoplastic article according to claim 10 wherein said first outer layer and said second outer layer comprise a polyolefin polymer or copolymer blended with a graft copolymer of polyethylene and an unsaturated fused ring carboxylic acid anhydride containing an effective amount of a prodegradant selected from the group consisting of manganese stearate, iron stearate, cerium stearate and mixtures thereof and said core layer comprises a water soluble, biodegradable polyvinyl alcohol.

12. A multilayer degradable thermoplastic article according to claim 10 wherein said first outer layer and said second outer layer comprise a linear low density polyethylene and said core layer comprises a water soluble, biodegradable polyvinyl alcohol.

13. A multilayer degradable thermoplastic article according to claim 12 wherein said first outer layer and said second outer layer comprise a linear low density polyethylene containing an effective amount of cerium stearate and said core layer comprises polyvinyl alcohol and said multilayer degradable thermoplastic article is further characterized as having a ratio of said first outer layer to said core layer to said second outer layer of between 2:1:2 to 1:10:1.

14. A multilayer degradable thermoplastic article according to claim 10 wherein said first outer layer and said second outer layer comprise a linear low density polyethylene having a density of between about 0.915 g/cm$^3$ and about 0.945 g/cm$^3$ and a melt index of between about 0.6 and about 1.5 and said core layer comprises: (1) a polyvinyl alcohol characterized as a homopolymer having a degree of hydrolysis from 84–95% and having an external plasticizer to permit conventional thermoplastic extrusion; or (2) a polyvinyl alcohol copolymer as characterized by a degree of hydrolysis from 84%–88% and having as an internal plasticizer to permit conventional thermoplastic extrusion grafted comonomer segments comprising oligomeric polyethylene glycol having 1-30 repeating units in addition to a few percent of an external plasticizer; or (3) mixtures thereof.

15. A multilayer degradable thermoplastic article according to claim 10 wherein said first outer layer adhesive resin and said second outer layer comprises a modified polyolefin characterized as having a density of between about 0.91 and about 0.96 gm/cm$^3$ and a melt index of between about 0.3 and about 13 gm/10 min and contain an effective amount of a transition metal stearate and said core layer comprises: (1) a polyvinyl alcohol characterized as a homopolymer having a degree of hydrolysis from 84–95% and having an external plasticizer to permit conventional thermoplastic extrusion; or (2) polyvinyl alcohol copolymer as characterized by a degree of hydrolysis from 84%–88% and having as an internal plasticizer to permit conventional thermoplastic extrusion grafted comonomer segments comprising oligomeric polyethylene glycol of 1-30 repeating units in addition to a few percent of an external plasticizer; o (3) mixtures thereof.

16. A multilayer degradable thermoplastic article according to claim 1 or claim 10 or claim 15 wherein said effective amount of prodegradant in each of said first outer layer and said second outer layer is an effective amount between about 0.01 weight percent and about 3.0 weight percent based upon the weight of said layer in which said transition metal stearate is present.

17. A multilayer degradable thermoplastic article according to claim 16 wherein said prodegradant is present in an effective amount between about 0.1 and about 1.5 weight percent.

18. A multilayer degradable thermoplastic article according to claim 17 wherein said prodegradant is present in an effective amount between about 0.3 and about 1.0 weight percent.

19. A multilayer degradable thermoplastic article according to claim 1 wherein an effective amount of an antioxidant is present.

20. A multilayer degradable thermoplastic article according to claim 16 wherein an effective amount of an antioxidant is present.

21. A multilayer degradable thermoplastic article according to claim 20 wherein said antioxidant is present in an effective amount between about 0.001 and about 1.0 weight percent.

22. A multilayer degradable thermoplastic article according to claim 21 wherein said antioxidant is present in an effective amount between about 0.0025 and about 0.1 weight percent.

23. A multilayer degradable thermoplastic article according to claim 16 wherein said core layer contains between about 0.01 weight percent and about 3.0 weight percent transition metal stearate with the proviso that the weight percent of said transition metal stearate in said core layer is less than the weight percent transition metal stearate in said first outer layer or said second outer layer.

24. A multilayer degradable thermoplastic article according to claim 23 wherein said prodegradant is present in an effective amount between about 0.1 and about 1.5 weight percent.

25. A multilayer degradable thermoplastic article according to claim 24 wherein said prodegradant is present in an effective amount between about 0.3 and about 1.0 weight percent.

26. A multilayer degradable thermoplastic article according to claim 24 wherein an effective amount of an antioxidant in said core layer is correlated to the effective amount of said prodegradant in said first and second outer layers.

27. A multilayer degradable thermoplastic article according to claim 24 wherein an effective amount of an antioxidant is also present in said core layer and in first and second outer layers.

28. A multilayer degradable thermoplastic article according to claim 27 wherein said antioxidant is present in an effective amount between about 0.001 and about 1.0 weight percent.

29. A multilayer degradable thermoplastic article according to claim 28 wherein said antioxidant is present in an effective amount between about 0.0025 and about 0.1 weight percent.

30. A multilayer degradable thermoplastic article according to claim 16 wherein the weight ratio of said first outer layer to said core layer to said second outer layer is between about 10:1:10 and about 1:50:1.

31. A multilayer degradable thermoplastic article according to claim 30 wherein said weight ratio is between about 2:1:2 and about 1:10:1.

32. A multilayer degradable thermoplastic article according to claim 30 wherein said multilayer degradable thermoplastic article is a film having a thickness between about 0.1 mil and about 5.0 mils.

33. A multilayer degradable thermoplastic article according to claim 32 wherein said film has a thickness between about 0.5 mil and about 3.0 mils.

34. A multilayer degradable thermoplastic article according to claim 1 or claim 10 or claim 15 comprising at least five layers comprising:
   (i) a first outer layer of linear low density polyethylene;
   (ii) a first tie layer of a modified polyolefin adhesive resin;
   (iii) a core layer of a polyvinyl alcohol;
   (iv) a second tie layer of a modified polyolefin adhesive resin;
   (v) a second outer layer of a linear low density polyethylene;
wherein said core layer comprises at least 50 weight percent of the total weight of the multilayer degradable film and said first outer layer and second outer layer contain an effective amount of a prodegradant.

35. A degradable bag formed from a multilayer degradable thermoplastic article as defined in claim 1.

36. A degradable bag formed from a multilayer degradable thermoplastic article as defined in claim 2.

37. A degradable bag formed from a multilayer degradable thermoplastic article as defined in claim 4.

38. A degradable bag formed from a multilayer degradable thermoplastic article as defined in claim 10.

39. A degradable bag formed from a multilayer degradable thermoplastic article as defined in claim 11.

40. A degradable bag formed from a multilayer degradable thermoplastic article as defined in claim 32.

41. A method for composting an organic material stored in a thermoplastic/container comprising providing said organic material to a shredding means wherein said thermoplastic container is shredded into pieces smaller than the initial thermoplastic container, introducing the organic material and shredded thermoplastic container to a composting pile, composting said composting pile under effective composting conditions for an effective period of time wherein said thermoplastic container comprises a three layer structure characterized by a first outer layer and a second outer layer which are characterized as containing an effective amount of a prodegradant to promote photodegradation and/or thermal degradation and a core layer wherein the core layer is characterized as being more water soluble and/or more biodegradable than said first outer layer and said second outer layer.

42. A composting method according to claim 41 having at least three layers of thermoplastic material comprising a first outer layer, a second outer layer, and a core layer, wherein the first outer layer and second outer layer are characterized as containing an effective amount of a prodegradant and said core layer is characterized as being more water soluble and/or more biodegradable than said first outer layer and said second outer layer.

43. A composting method according to claim 42 wherein said core layer is substantially more water soluble and/or more biodegradable than said first outer layer and said second outer layer.

44. A composting method according to claim 42 or claim 43 wherein said first outer layer and said second outer layer are selected from the group consisting of polyethylene, polypropylene, polybutene, polymethylpentene, nylon, polyolefinic adhesive resins, ethylene-vinyl acetate copolymers, ethylene acid copolymers, ethylene-ethyl acrylate, ethylene-methyl acrylate, polyesters, ethylene propylene rubbers, and mixtures thereof and said core layer is selected from the group consisting of polyvinyl alcohol, ethylene-vinyl alcohol, polycaprolactone, polyethylene oxide, and mixtures thereof.

45. A composting method according to claim 42 or claim 43 wherein said first outer layer and said second outer layer comprise a modified polyolefinic adhesive resin, said core layer comprises a water soluble, biodegradable polyvinyl alcohol and said prodegradant is cerium stearate.

46. A composting method according to claim 44 wherein said first outer layer and said second outer layer comprise a nylon and said core layer comprises a polyvinyl alcohol.

47. A composting method according to claim 44 wherein said first outer layer and said second outer layer comprise a low density polyethylene and said core layer comprises a blend of polyvinyl alcohol and at least one biodegradable additive.

48. A composting method according to claim 47 wherein said biodegradable additive is selected from the group consisting of polycaprolactone, starch, starch derivatives, natural proteins, cellulosic materials, sugars, natural rubbers, natural gums, and mixtures thereof.

49. A composting method according to claim 45 wherein said first outer layer and said second outer layer comprises modified polyolefin resin and said core layer comprises a blend of water soluble, biodegradable polyvinyl alcohol and a biodegradable polycaprolactone.

50. A composting method according to claim 47 wherein said first outer layer and said second outer layer comprise a linear low density polyethylene and said core layer comprises a water soluble, biodegradable polyvinyl alcohol.

51. A composting method according to claim 41 wherein said first outer layer and said second outer layer contain an effective amount of at least one organic salt of a polyvalent transition metal as said prodegradant and said core layer comprises a water soluble, biodegradable polyvinyl alcohol.

52. A composting method according to claim 51 wherein said first outer layer and said second outer layer comprise a polyolefin polymer or copolymer blended with a graft copolymer of polyethylene and an unsaturated fused ring carboxylic acid anhydride containing an effective amount of a prodegradant selected from the group consisting of manganese stearate, iron stearate, cerium stearate and mixtures thereof and said core layer comprises a water soluble, biodegradable polyvinyl alcohol.

53. A composting method according to claim 51 wherein said first outer layer and said second outer layer comprise a linear low density polyethylene and said core layer comprises a water soluble, biodegradable polyvinyl alcohol.

54. A composting method according to claim 53 wherein said first outer layer and said second outer layer comprise a linear low density polyethylene containing an effective amount of cerium stearate and said core layer comprises polyvinyl alcohol and said multilayer degradable thermoplastic article is further characterized as having a ratio of said first outer layer to said core layer to said second outer layer of between 2:1:2 to 1:10:1.

55. A composting method according to claim 51 wherein said first outer layer and said second outer layer comprise a linear low density polyethylene having a density of between about 0.915 g/cm³ and about 0.945 g/cm³ and a melt index of between about 0.6 and about 1.5 and said core layer comprises: (1) a polyvinyl alcohol characterized as a homopolymer having a degree of hydrolysis from 84-95% and having an external plasticizer to permit conventional thermoplastic extrusion; or (2) a polyvinyl alcohol copolymer as characterized by a degree of hydrolysis from 84%-88% and having as an internal plasticizer to permit conventional thermoplastic extrusion grafted comonomer segments comprising oligomeric polyethylene glycol having 1-30 repeating units in addition to a few percent of an external plasticizer; or (3) mixtures thereof.

56. A composting method according to claim 51 wherein said first outer layer and said second outer layer comprises a modified polyolefin characterized as having a density of between about 0.91 and about 0.96 gm/cm³ and a melt index of between about 0.3 and about 13 gm/10 min and contain an effective amount of a transition metal stearate and said core layer comprises: (1) a polyvinyl alcohol characterized as a homopolymer having a degree of hydrolysis from 84-95% and having an external plasticizer to permit conventional thermoplastic extrusion; or (2) polyvinyl alcohol copolymer as characterized by a degree of hydrolysis from 84%-88% and having as an internal plasticizer to permit conventional thermoplastic extrusion grafted comonomer segments comprising oligomeric polyethylene glycol of 1-30 repeating units in addition to a few percent of an external plasticizer; or (3) mixtures thereof.

57. A composting method according to claim 56 wherein said effective amount of transition metal stearate in each of said first outer layer and said second outer layer is an effective amount between about 0.01 weight percent and about 3.0 weight percent based upon the weight of said layer in which said transition metal stearate is present.

58. A composting method according to claim 57 wherein said core layer contains between about 0.3 weight percent and about 1.0 weight percent transition metal stearate with the proviso that the weight percent of said transition metal stearate in said core layer is less than the weight percent transition metal stearate in said first outer layer or said second outer layer.

59. A composting method according to claim 41 wherein the weight ratio of said first outer layer to said core layer to said second outer layer is between about 10:1:10 and about 1:50:1.

60. A composting method according to claim 59 wherein said weight ratio is between about 2:1:2 and about 1:10:1.

61. A composting method according to claim 59 or claim 60 wherein said multilayer degradable thermoplastic article is a film having a thickness between about 0.1 mil and about 5.0 mils.

62. A composting method according to claim 46 wherein said film has a thickness between about 0.5 mil and about 3.0 mils.

63. A composting method according to claim 41 comprising at least five layers comprising:
(i) a first outer layer of linear low density polyethylene;
(ii) a first tie layer of a modified polyolefin adhesive resin;
(iii) a core layer of a polyvinyl alcohol;
(iv) a second tie layer of a modified polyolefin adhesive resin;
(v) a second outer layer of a linear low density polyethylene;

wherein said core layer comprises at least 50 weight percent of the total weight of the multilayer degradable film and said first outer layer and second outer layer contain an effective amount of a prodegradant.

64. A method for composting an organic material according to claim 41 wherein said effective period of time for said composting of said organic material and said shredded thermoplastic container does not substantially exceed the effective composting period of time for said organic material sans said shredded thermoplastic container.

65. A method for composting an organic material according to claim 41 wherein after composting under effective composting conditions the tensile load of said thermoplastic container has decreased to less than 50 percent of the original thermoplastic container prior to having undergone composting.

66. A composting bag formed from a multilayer thermoplastic film having a first outer layer, a core layer and a second outer layer wherein the first outer layer and second outer layer are characterized as containing an effective amount of prodegradant and said core layer is characterized as being more water soluble and/or more biodegradable than said first outer layer and said second outer layer and wherein the core layer comprises greater than 50 percent by weight of the total film weight.

67. A composting bag according to claim 52 wherein said first outer layer and said second outer layer contain an effective amount of cerium stearate.

68. A composting bag according to claim 66 wherein said first outer layer and said second outer layer are selected from the group consisting of: (a linear low density polyethylene having a density of between about 0.915 g/cm³ and about 0.945 g/cm³ and a melt index of between about 0.6 and about 1.5; polyolefin polymer or copolymer blended with a graft copolymer of polyethylene and an unsaturated fused ring carboxylic acid anhydride, and mixtures thereof; and said core layer comprises a major amount of at least one of: (1) a polyvinyl alcohol characterized as a homopolymer having a degree of hydrolysis from 84-95% and having an external plasticizer to permit conventional thermoplastic extrusion; and (2) a polyvinyl alcohol copolymer as characterized by a degree of hydrolysis from 84%-88% and having as an internal plasticizer to permit conventional thermoplastic extrusion grafted comonomer segments comprising oligomeric polyethylene glycol having 1-30 repeating units in addition to a few percent of an external plasticizer.

* * * * *